May 28, 1963  K. M. McRAE ET AL  3,090,961
APPARATUS FOR FASTENING STRUCTURAL MEMBERS
Filed July 21, 1961  4 Sheets-Sheet 2

INVENTORS
KENNETH M. McRAE &
CARL E. HOOVER
BY
ATTORNEYS

May 28, 1963 K. M. McRAE ET AL 3,090,961
APPARATUS FOR FASTENING STRUCTURAL MEMBERS
Filed July 21, 1961 4 Sheets-Sheet 3

INVENTORS
KENNETH M. McRAE &
CARL E. HOOVER
BY
Gardner & Zimmerman
ATTORNEYS

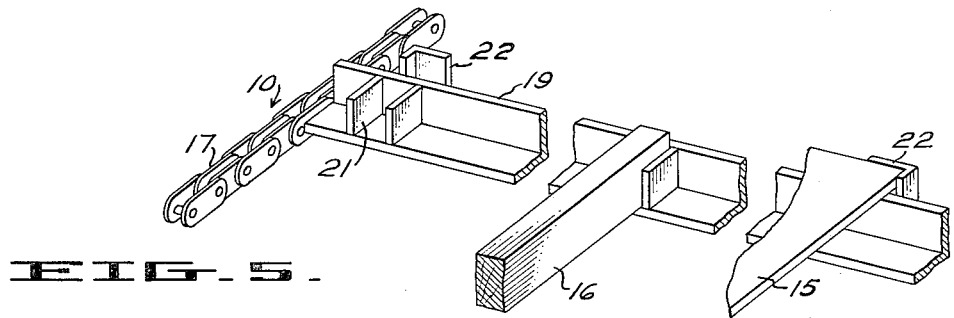
FIG. 5.
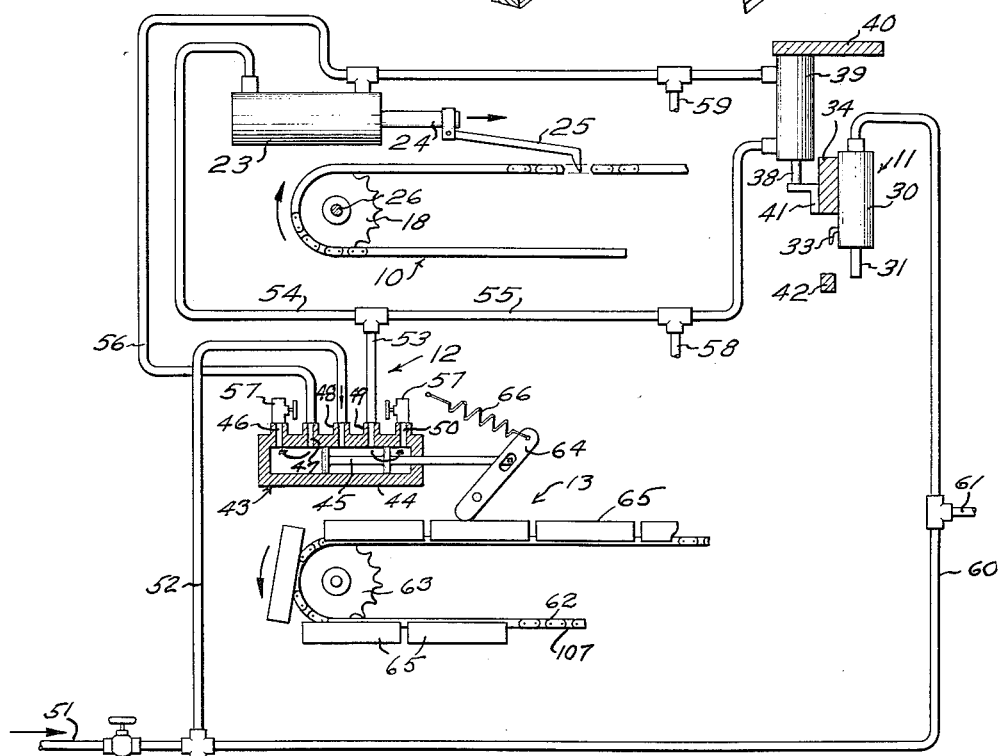
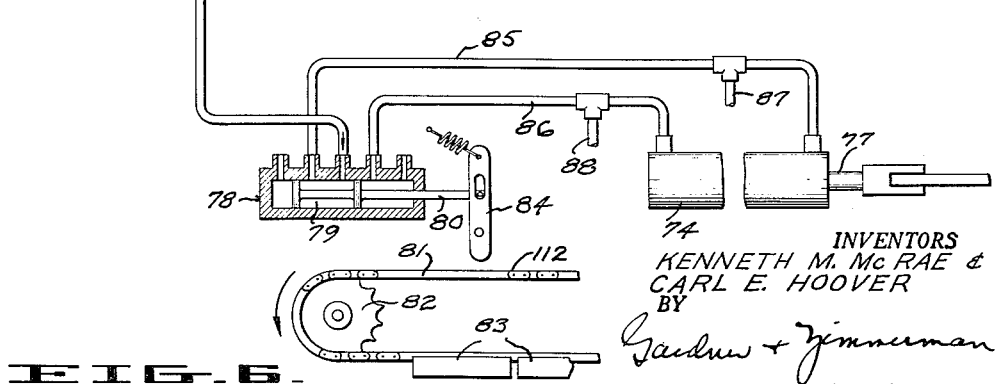
FIG. 6.
INVENTORS
KENNETH M. McRAE &
CARL E. HOOVER
BY
ATTORNEYS United States Patent Office 3,090,961
Patented May 28, 1963

3,090,961
APPARATUS FOR FASTENING STRUCTURAL MEMBERS
Kenneth M. McRae, 238 Esther Court, Hayward, Calif., and Carl E. Hoover, 452 Ruth Court, San Leandro, Calif.
Filed July 21, 1961, Ser. No. 125,793
5 Claims. (Cl. 1—151)

This invention relates, in general, to apparatus for fastening together structural members, and more particularly, to an apparatus for conveying structural members beneath a fastening means for the application of fastening elements through the structural members.

In the building industry, during the assembly of panel structures, or the like, such as roof paneling, pallets or fences, for example, much time is spent in the fastening together of the various structural members on the job. The time consumed in nailing or stapling panel members to struts or the like generally comprises the largest single operation in the erection of such reinforced panel structures.

It is, therefore, one of the principal objects of this invention to provide an apparatus which will fasten structural members together to allow for the pre-fabrication of structural panel sections.

Another object of the invention is to provide an apparatus which will continuously operate in its fastening operation so as to provide for a relatively quick assembly of panelled structures.

Another object of this invention is to provide a conveyor system which will cooperate with a fixed fastening system to nail, staple, or otherwise fasten lapped structural members together.

Another object of this invention is to provide a power system for operating a fastener driving system in conjunction with a conveyor system designed to carry structural members disposed in predetermined lapped relation to the fastener driving system for fastening thereat.

Another object of this invention is to provide a timing system for the systematic operation of a means for loading structural members on a conveyor system and a means for fastening such structural members together at predetermined spaced locations.

Another object of this invention is to provide a loading device for the loading of structural members onto a conveyor system.

Another object of this invention is to provide a portable structural member fastening apparatus which may easily be moved about from job to job.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by said drawing and description may be adopted within the scope of the invention as set forth in the claims.

FIGURE 5 is a fragmentary perspective view of the conveyor and structural member supporting means shown in FIGURE 1.

FIGURE 6 is a diagrammatic view illustrating the operation of the timing mechanisms and compressed air drive system illustrated in FIGURES 1 and 2.

Figure 1:
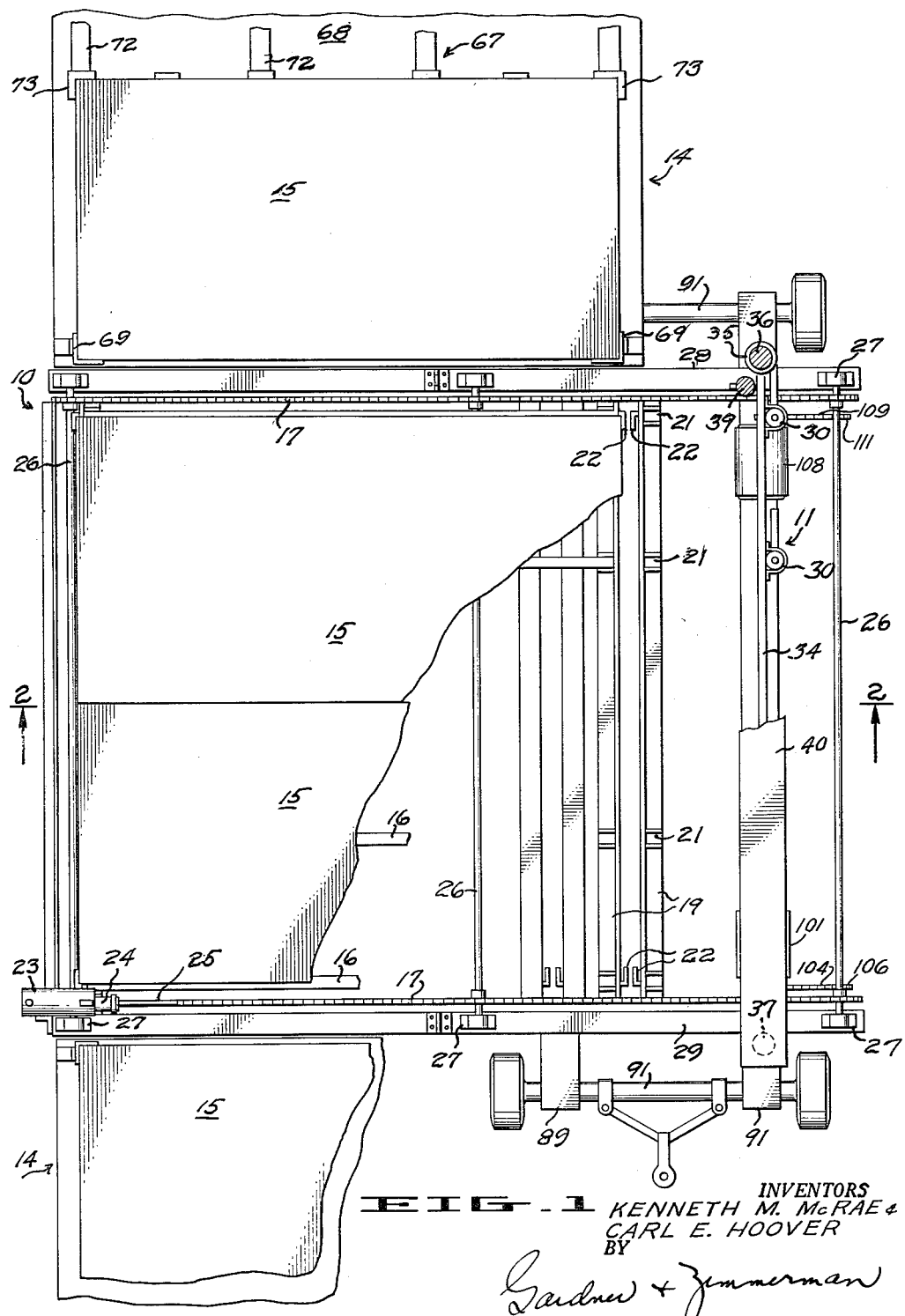
FIGURE 1 is a top elevation of a preferred embodiment of the fastening apparatus and a side loading apparatus for processing wooden panels and struts, certain parts of the apparatus, panels and struts being broken away to show details of construction.

In broad terms, the apparatus of the present invention includes a conveying means 10 which is adapted to carry structural members in lapped relation beneath a fastener driving system 11, preferably a pneumatically operated driving system. Both the conveying means 10 and the driving system 11 are adapted to be actuated in conjunction with each other through a fluid pressure power system generally designated by the numeral 12, and a timing mechanism 13 for controlling the power system and allowing the structural members to be advanced on the conveying means and fastened together by the fastener driving system in synchronous relation. Loading devices 14 are provided on either side of the conveying means which are designed to project structural members onto the conveying means 10. In the embodiment shown in the drawings, wooden panel sections 15 are loaded on the loading device and are fastened to wooden strut members 16 placed on the conveying means 10, but it is understood that other structural members in a variety of relationships to each other may be fastened together with the apparatus in a like manner within the scope of the invention.

Referring first to the conveying means 10, it will be seen that this consists generally of a rotatable conveyor designed to carry the structural members along a predetermined path and actuated by a fluid pressure cylinder and piston means. The conveyor consists of a pair of parallel chains 17 placed on either side of the apparatus and designed to turn on sprocket members 18. Rigidly attached to and connecting the chains 17 is the support section for receiving the structural members which is adapted to rotate with the chains 17. The support section, as best seen in FIGURE 5, consists of angle members 19 running transverse of and attached to the chains 17, spaced blocks within the angles 19 to provide slots 21 for the reception of the strut members 16, and angle members 22 connected to the rear of the members 19 designed to hold and guide the panels 15. In the embodiment shown the support section is designed to carry the flat wooden panel members 15 and 2" x 4" wooden strut members 16 to form a standard type of roof paneling, but other structural sections may be formed by modifying the supporting sections and the structural members within the scope of the invention as was previously pointed out. The means for moving the conveyor comprises a cylinder 23 having a piston 24 received therein and a pawl-like arm 25 attached to said piston 24 and adapted to move therewith. As can be seen most clearly in FIGURE 6, the pawl-like arm 25 is also received in the chain 17. To actuate the conveyor, fluid pressure is received in the rear of the cylinder 23 thus forcing the piston 24 forward (in the direction of the arrow in FIGURE 6) and causing the arm 25 to move in the same direction. The arm 25, being received in the chain 17, causes the chain, and hence the whole conveyor, to move forward for the length of the piston stroke. When fluid pressure is introduced into the front end of the cylinder 23 the piston 24 is moved back to the rear of the cylinder while the pawl-like arm 25 slides over the chain 17 and thus imparts no motion to the conveyor system. The continuous reciprocating motion of the piston 24 will, therefore, cause an intermittent forward motion in the conveyor. The conveyor is supported on the apparatus through the axle members 26 which connect and rotate with the sprocket members 18 and which are received in bearing members 27 located on the horizontal support frame members 28 and 29.

Referring next to the fastener driving system 11, it will be seen that this consists, in general, of a series of drives, preferably pneumatic hammers 30, arranged at one end of the conveyor over the structural members and adapted to be raised and lowered into a position to apply a fastening element through said structural members by fluid pressure cylinder and piston means. The hammers 30 are of a standard pneumatic type having a head portion 31, which drives the fastening element into the structural members, a magazine 32 for feeding fastening elements, such as nails or staples, to the head portion, and a trigger 33 which when actuated will cause the head portion to drive the fastening element. A plurality of such hammers, each being aligned with a strut which is to be fastened to a panel member, are arranged on a movable hammer supporting member 34 and rigidly attached thereto. The hammer supporting member 34 is provided with collars 35 at each end thereof which are adapted to slide over a short distance on vertical support posts 36 and 37 when the apparatus is operated. The raising and lowering of the hammers is accomplished through fluid pressure pistons 38 and cylinders 39 located at either end of a horizontal support member 40 which is placed atop the vertical support posts 36, 37. The pistons 38 are designed to raise and lower the hammers through flanges 41 which are rigidly attached to both the pistons 38 and the hammer supporting member 34. To lower the hammers, fluid pressure is introduced into the top of cylinders 39 causing the pistons 38 to move downward carrying the hammer supporting member 34 and the hammers 30 with them. When fluid pressure is introduced into the bottom of the cylinders 39, the pistons 38, and consequently the hammers 30, will be forced upwards. The pneumatic hammers are caused to operate and drive a nail or staple through the lapped structural members when they are in their lowermost position directly over the structural members. At that time the triggers 33 will all be simultaneously tripped by a trigger actuating bar 42 which runs between the vertical support posts 36, 37, and is connected thereto. The tripping of the triggers allows fluid pressure means within the hammers 30 to cause the head portion 31 to drive a nail or staple through the structural members. In the embodiment shown, two hammers are arranged on each side of the apparatus so as to fasten two struts 16 to each panel section 15, two paneling sections being formed at the same time.

The compressed air power system 12, provided in the embodiment shown, is adapted to alternately introduce fluid pressure into opposite ends of the hammer operating cylinders 39 and conveyor operating cylinder 23 as previously explained. This power system comprises, generally, a two-way valving member 43 for sequentially directing the compressed air through a plurality of pressure lines which are connected with the cylinders 39, 23. As can be seen most clearly in FIGURE 6, the two-way valving member 43 consists of a cylinder 44 into which compressed air from an external source is introduced and a two-headed piston member 45 whose relative position within the cylinder 44 serves to direct the compressed air through different pressure lines. The cylinder 44 is provided with a plurality of ports 46, 47, 48, 49 and 50 for cooperation with the piston 45 in channeling the air pressure within the cylinder 44. A system of pressure lines is utilized to direct the air pressure from the source at 51 (FIGURE 6) to the hammer and conveyor actuating cylinders 39, 23. This pressure system consists of a pressure line 52 which will constantly direct compressed air into the valving cylinder 44 through port 48, pressure lines 53, 54 and 55 which direct compressed air from port 49 to the rear of cylinder 23 and the bottom of cylinders 39 to move the piston members therein and actuate the hammers and conveyor as previously explained, and pressure line 56 which directs compressed air through port 47 to the front end of the conveyor actuating cylinder 23 and the top of the hammer actuating cylinder 39 for the second phase of the operating cycle of these members discussed previously. Ports 46 and 50 allow for the exhausting of the air pressure in pressure lines 56 and 53 respectively during each cycle of the operation, and these ports are provided with bleeder valves 57 so that the air will not be expelled from the system too quickly allowing for a controlled slow movement of the conveyor and hammer actuating pistons 24 and 38. One of the primary purposes of this last feature is to prevent the hammers 30 from being dropped too rapidly over the structural members. Junction pressure lines 58 and 59 are provided in pressure lines 55, 56 respectively for the operation of the second cylinder 39 and piston 40 which is not shown in FIGURE 6. A pressure line 60 is also provided from the compressed air source to the hammers 30 to provide a constant source of compressed air which will actuate the hammers when the triggers 33 are tripped as previously explained. Junction pressure lines such as 61, shown in FIGURE 6, provide pressure lines to each of the separate hammer members.

Figure 2:
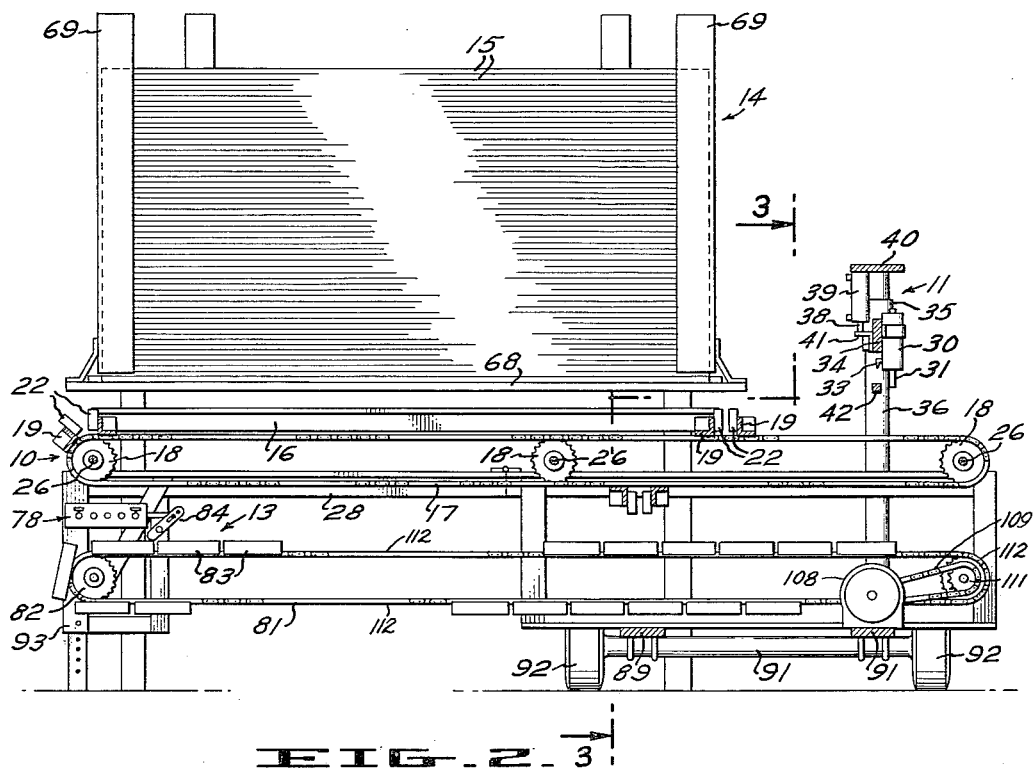
FIGURE 2 is a longitudinal sectional view taken substantially on the line 2—2 in FIGURE 1.
Figure 3:
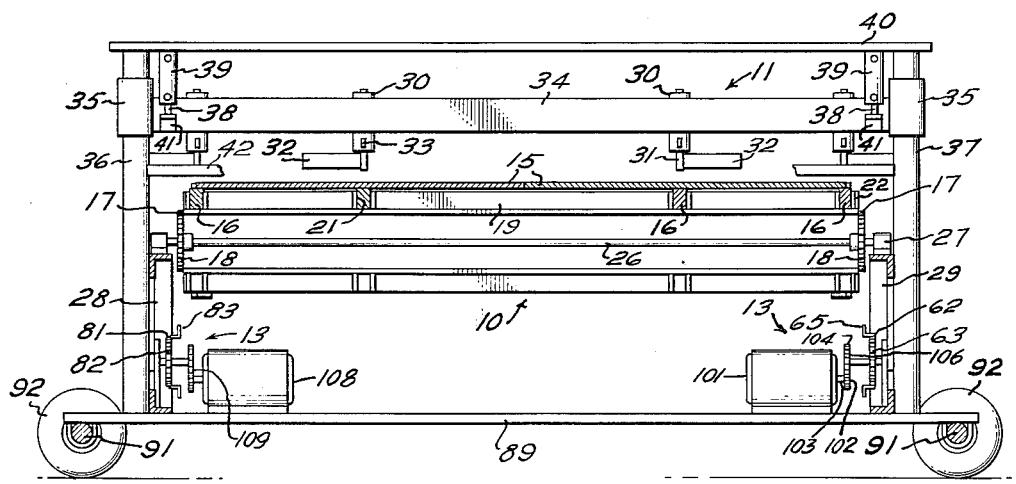
FIGURE 3 is a transverse sectional view taken substantially on the line 3—3 in FIGURE 2.

The means for causing the power system 12, and more particularly, the valving member 43 to operate is the timing mechanism 13 which is best seen in FIGURE 6. This consists, in general, of a rotatable element, embodied here as a chain 62 and sprocket 63 driven means, which serves to pivot a lever element 64 at spaced time intervals. More particularly, as shown in FIGURES 1 and 2, there is provided a motor 101 having a sprocket 102 secured to the drive shaft 103 thereof, and a drive chain 104 carried on and driven by the sprocket 102. A sprocket 106 is mounted for movement on the same shaft as sprocket 63, and by means of a chain 104 drives the sprocket 63 and chain 62. The lever element 64 is operatively connected to valve piston 45, so that when it pivots it causes the piston 45 to assume different positions within the valve cylinder 44 directing air pressure through different ports sequentially as was previously explained. The lever element 64 is caused to pivot by enlarged detent portions 65 located on the rotating chain 62. As these detent portions 65 pass beneath the lever 64 they cause it to pivot and move the piston 45 in one phase of the cycle, while a spring 66 on the lever element 64 will snap the lever back into a vertical position after the detent portions have passed beneath thus moving the piston 45 in the opposite direction in the second phase of the operating cycle. More particularly, and as will be evident, as a continuous succession of detent portions 65 pass beneath the lever 64, the latter is retained in its pivoted position indicated in FIGURE 6, the adjacent detent portions being in sufficiently close relation to so position the lever. When a chain portion from which the detents 65 are omitted, as for example the portion 107 of the chain 62, passes beneath the lever 64, the lever is allowed to snap into its other position, which is essentially the same as the position of the lever 84 shown in FIGURE 6 and to be subsequently described.

The operation of the whole apparatus is best seen in FIGURE 6, in diagrammatic form. In the phase of operation that is pictured, the detent portions 65 on the timing mechanism 13 are passing beneath the lever element 64 causing it to pivot to the right extending the spring 66 and moving the piston 45 within the valve cylinder 44 into the position shown. In this position the compressed air entering the system from the source at 51 will flow through line 52 and into the cylinder at port 48, exit the cylinder at port 49, and cause a buildup of pressure in lines 53, 54, and 55. This pressure, when entering the conveyor actuating cylinder 23, will cause the piston 24 and the pawl-like arm 25 to move to the right thus moving the conveyor chain 17 and the structural members forward in an increment of length which is measured by the length which piston 24 is designed to travel in one direction within the cylinder 23. At the same time, the pressure in line 56 will cause the piston members 38 to be raised within cylinders 39. The raising of these hammer actuating pistons 38 cause the hammer supporting members 34, and thus all the hammers 30, to be raised simultaneously. During the first phase of the cycle of operation just set forth, the pressure previously built up in line 56 will be exhausted through port 47 and out port 46 in the cylinder valve 44. The bleeder valve 57 is used at port 46 so that the conveyor and hammers will not be moved too rapidly as previously explained.

When the conveyor and the lapped structural members positioned thereon have been moved one full increment of distance to where the next nail or staple is to be applied and the hammers have been completely raised, the detent portions 65 will have passed the lever element 64 allowing the spring 66 to snap it back into the vertical position causing the piston 45 to move to the left and open ports 47, 48 as conduits for the air pressure from line 52. This pressure will now enter cylinder 23 through pressure line 56 at the opposite end from that in the first phase driving piston 24 to the left as pawl 24 slides over the chain 17. The pressure in line 56 will be introduced simultaneously into the top of the cylinder 39 to lower the piston 38 and, consequently, the hammers 30. Pressure is exhausted in the lines 54 and 55 during this second phase of the cycle of operation through line 53 into the cylinder 44 and out port 50 through the bleeder valve 57 in a gradual manner so that the hammers do not drop too quickly, as has been explained. As piston 38 is extended fully and the hammers are lowered to a position directly over the panels and struts, the trigger bar 42 will actuate the triggers 33 and cause the hammers to drive a fastener element through the lapped panels and struts to secure them together. When this operation is completed the detent portions 65 in the timing mechanism will again engage lever 64 to start a new cycle.

It has been found that in roofing panels such as are illustrated, the panels and struts should be stapled together about every three inches along the struts. Therefore, the piston 24 should be designed to move about three inches at a time while the hammers are raised. Also as will be understood where the panels and struts are to be secured in the relationship shown but in a position rotated 90 degrees from the position shown, the piston will be arranged for intermittent operation in accordance with greater spacing of the struts.

The loading of the apparatus with the structural members may be accomplished in a variety of ways, but the drawings illustrate a preferred method which includes the use of side loading devices 14 loading the conveying means from both sides. These loading devices 14 preferably include movable push means 67 positioned adjacent the edge of the bottom member in a stack of panel members 15 to be loaded onto the conveying means. The push means when actuated by a driving means subsequently described will urge the bottom panel out from the stack. More specifically, the panel members are stacked on a supporting frame structure comprising a base plate 68 upon which the panels rest and upright guide members 69 at the proximal corners of the stack relative to the conveying means supported upon the base plate and spaced therefrom by an amount substantially equal the thickness of one panel member. The lowermost panel is hence free to slide under the guide members 69 towards the conveying means.

Figure 4:
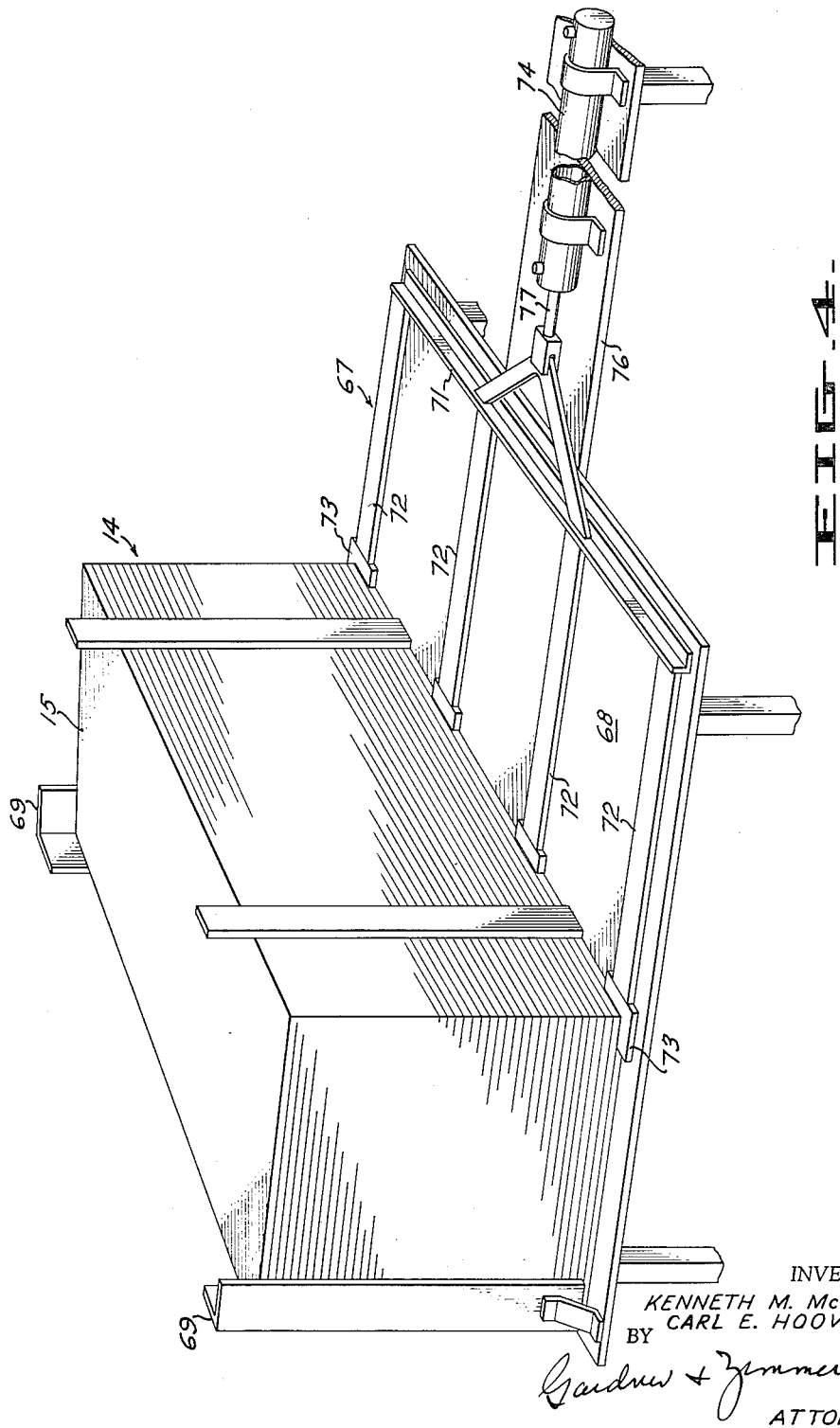
FIGURE 4 is a fragmentary perspective view illustrating the operation of the loading device.

The push means 67 as best shown in FIGURE 4 then preferably comprises a beam 71 slidably supported upon the base plate 68 parallel to the distal edges of the stack of panel members relative to the conveying means. A plurality of push arms 72 project from the beam at longitudinally spaced positions thereof into engagement with the edge of the lowermost panel of the stack. The outermost pair of the arms 72 have angles 73 secured thereto which engage the corners of such lowermost panel. The driving means then is best provided by a pneumatic cylinder 74 rigidly secured to an extension 76 of the base plate 68 and having a piston 77 secured to the beam 71. Thus when the cylinder 74 is actuated to extend its piston outward, the push arms 72 projecting from the beam urge the lowermost panel of the stack from under the overlying panels thereof and onto the conveying means. When the piston is again retracted, the remainder of the stack thus rests upon the base plate and the lowermost panel is engaged by the push arms.

The means for providing fluid pressure alternately to the opposite ends of the cylinder 74, as shown in FIGURE 6, is constructed and operated in much the same manner as is the fluid pressure power system 12 and the timing mechanism 13 of the fastening apparatus previously described. Compressed air from the source 51 is conducted through a two-way cylinder valve 78 which consists of ported cylinder 79 and piston 80 operable therein, and which operates in the same manner as valving member 43. A rotatable element comprising a chain 81 and sprocket 82, set up on the opposite side of the conveyor from the chain 62 and sprocket 63 and operable in a similar manner thereto, has enlarged detent portions 83 which cooperate with a pivoting lever 84 in actuating the valve piston 80 to provide alternate pressure in lines 85 and 86 connected to the front and rear of cylinder 74 respectively, and so move the piston 77 between its extended and withdrawn positions. More particularly, a motor 108 is arranged to drive a sprocket 111 by means of a chain 109, the sprocket 111 being mounted on the same shaft as the sprocket 82 and thereby enabling motor 108 to drive the sprocket 82 and chain 81. Also, similar to the lever 64 and detent portions 65, the detent portions 83 on the chain 81 are positioned closely together so as to keep the lever arm 84 pivoted when the detents 83 pass thereunder, as shown in FIGURE 2. When a chain portion from which the detents 83 are omitted, such as depicted by the portions 112 of the chain 81, passes by the lever 84, the lever is snapped back to the position shown in FIGURE 6. As illustrated in FIGURE 1, panels may be moved onto the conveyor from both sides, and to provide for this, junction lines such as 87, 88 may be provided in pressure lines 85, 86 to operate piston and push arm means similar to those shown.

The fastening apparatus, other than the loading devices, rests upon frame members 89 and 90 which are placed upon axle members 91. These axle members 91 are provided with wheels 92 so that the whole apparatus may be moved about from place to place and may be taken to the site of a construction job. It will also be noted that the longitudinal members 28 and 29 which support the conveying system are hinged in the middle so that they may be folded over the frame members 89 and 90 when the apparatus is to be moved. While the apparatus is set up to operate, these members 28, 29 are extended as shown and are provided with adjustable support legs 93 to keep the conveyor level in uneven terrain.

What is claimed is:

1. An apparatus of the character described comprising conveying means for receiving structural members disposed in predetermined overlapping relationship and transporting said members along a path, fastener driving means disposed along said path for fastening such structural members together, said fastener means including a vertically movable hammer support member having a hammer assembly carried thereon, a first piston and cylinder for moving said conveyor in spaced increments, a second piston and cylinder for reciprocating said support member, said hammer assembly having a third piston and cylinder for actuation thereof, trigger means engageable with said hammer assembly for actuation thereof when said support member is moved downwardly a predetermined distance, and fluid pressure control means including a two-way valve for supplying pressure to said pistons and cylinders for actuating said conveying means while retracting said support member upwardly and alternately moving said support member downwardly while resetting said conveying means.

2. An apparatus for the continuous fastening of structural members disposed in overlapping relation comprising, in combination, conveying means for receiving a plurality of structural members to be fastened together, in a predetermined overlapping relation, fastener driving means disposed at a fixed location along said conveying means and operable to selectively drive fasteners into said structural members, a first cylinder and piston for moving said conveying means in spaced increments, a second cylinder and piston for actuating said driving means, and fluid pressure control means for supplying pressure to said cylinders and pistons for actuating said conveying means while retracting said driving means and alternately resetting said conveying means while actuating said driving means.

3. An apparatus for the continuous fastening of structural members in a predetermined overlapped relationship comprising, in combination, conveying means for conveying said structural members along a predetermined path, fastener driving means placed at a predetermined location along said path and movable between a raised position and a lowered position and a lowered position directly overlyingly adjacent said path, said driving means being automatically actuated at said lowered position, a cylinder and piston for moving said conveying means in spaced increments and a second cylinder and piston for raising and lowering said hammer means in synchronous relation with said incremental movement of said conveying means, pressure lines connected to each of said first and second cylinders for introducing fluid pressure to drive said first and second pistons, a cylinder valve member having a plurality of ports which receive said pressure lines, a valve piston received in said cylinder valve member and movable therein to direct fluid pressure sequentially through different of said ports to alternate pressure lines, a pivotable member connected to and for driving said valve piston, and a rotatable member having spaced projecting portions thereon which engage said pivotable member intermittently to control the movement of said valve piston.

4. An apparatus of the character described comprising means for conveying structural members disposed in overlapping relation along a predetermined path, fastener driving means for fastening such structural members together, and means for cooperating between said conveying means and said driving means so that said driving means applies fasteners to secure said structural members together at predetermined spaced points therealong, said means for cooperating between said driving means and said conveying means comprising, in combination, a two-way valve member having a plurality of ports, a piston member received in said valving member to direct fluid presure sequentially through different of said ports, and cylinder and piston means connected to said valve member through said ports and responsive to said valve member to actuate said driving means and said conveying means.

5. An apparatus for the continuous fastening of structural members disposed in overlapping relation comprising, in combination, conveying means for receiving a plurality of structural members to be fastened together, in a predetermined overlapping relation, fastener driving means disposed at a fixed location along said conveying means and operable to selectively drive fasteners into said structural members, and a fluid pressure system including a cylinder and piston for moving said conveying means in spaced increments and a second cylinder and piston for actuating said driving means in synchronous relation with said incremental movement of said conveying means, said fluid pressure system including a two-way valving system conducting fluid pressure to said first and second cylinders and pistons.

References Cited in the file of this patent
UNITED STATES PATENTS

| | | |
|---|---|---|
| 816,350 | Morgan | Mar. 27, 1906 |
| 904,503 | Billingsley | Nov. 24, 1908 |
| 2,115,175 | Miller | Apr. 26, 1938 |
| 2,529,777 | McInnis | Nov. 14, 1950 |
| 2,720,963 | Stanley | Oct. 18, 1955 |
| 2,862,207 | Newhouse | Dec. 2, 1958 |